United States Patent
Abe

(10) Patent No.: US 10,366,407 B2
(45) Date of Patent: Jul. 30, 2019

(54) INFORMATION PROCESSING DEVICE, INFORMATION PROCESSING METHOD, NON-TRANSITORY COMPUTER READABLE STORAGE MEDIUM, AND DISTRIBUTION DEVICE

(71) Applicant: YAHOO JAPAN CORPORATION, Tokyo (JP)

(72) Inventor: Yohei Abe, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 269 days.

(21) Appl. No.: 15/205,979

(22) Filed: Jul. 8, 2016

(65) Prior Publication Data
US 2017/0032410 A1 Feb. 2, 2017

(30) Foreign Application Priority Data

Jul. 27, 2015 (JP) .................. 2015-148090

(51) Int. Cl.
| | | |
|---|---|---|
| *G06Q 30/02* | (2012.01) | |
| *G06F 3/0485* | (2013.01) | |
| *G06F 3/0488* | (2013.01) | |
| *G06F 3/0484* | (2013.01) | |
| *G06F 17/22* | (2006.01) | |

(52) U.S. Cl.
CPC ....... *G06Q 30/0246* (2013.01); *G06F 3/0485* (2013.01); *G06F 3/0488* (2013.01); *G06F 2203/04803* (2013.01)

(58) Field of Classification Search
CPC . G06Q 30/0246; G06F 3/0485; G06F 3/0488; G06F 3/04845; G06F 17/2247
See application file for complete search history.

(56) References Cited

U.S. PATENT DOCUMENTS

| | | | | |
|---|---|---|---|---|
| 9,478,042 B1* | 10/2016 | Khandpur | ................. | G06T 7/62 |
| 9,804,761 B2* | 10/2017 | Voorhees | .............. | G06F 3/0485 |
| 9,824,074 B2* | 11/2017 | Krassner | ........... | G06F 17/30905 |
| 9,865,005 B1* | 1/2018 | Pottjegort | .......... | G06Q 30/0246 |
| 9,886,741 B2* | 2/2018 | Kim | .................... | G06F 3/04817 |

(Continued)

FOREIGN PATENT DOCUMENTS

| | | |
|---|---|---|
| JP | 2012-160034 A | 8/2012 |
| JP | 2012-185678 A | 9/2012 |

(Continued)

OTHER PUBLICATIONS

"Mac OS X Hints—One Way to Scroll in Form Boxes on the iPhone", published to web on Aug. 29, 2008 at http://hints.macworld.com/article.php?story=20080827084059882, retrieved on Dec. 5, 2018. (Year: 2008).*

(Continued)

*Primary Examiner* — Shourjo Dasgupta
(74) *Attorney, Agent, or Firm* — Oliff PLC

(57) ABSTRACT

An information processing device according to the present application includes a detecting unit and a predicting unit. The detecting unit detects a move operation to move contents displayed on a display screen of the information processing device. The specifying unit specifies a focused region on which a user is focused for the display screen of the information processing device based on a result of the detection by the detecting unit.

13 Claims, 8 Drawing Sheets

(56) References Cited

U.S. PATENT DOCUMENTS

| | | | |
|---|---|---|---|
| 2007/0079331 A1* | 4/2007 | Datta | A63F 13/12 725/42 |
| 2009/0265243 A1* | 10/2009 | Karassner | G06Q 30/02 705/14.54 |
| 2010/0058226 A1* | 3/2010 | Flake | G06F 3/0481 715/786 |
| 2010/0088641 A1* | 4/2010 | Choi | G06F 3/0482 715/828 |
| 2010/0131355 A1* | 5/2010 | Kitchen | G06Q 30/02 705/14.43 |
| 2010/0153544 A1* | 6/2010 | Krassner | G06F 17/2247 709/224 |
| 2011/0035274 A1* | 2/2011 | Goel | G06Q 30/02 705/14.45 |
| 2011/0141031 A1* | 6/2011 | McCullough | G06F 3/0481 345/173 |
| 2012/0026194 A1* | 2/2012 | Wagner | G06F 3/0485 345/647 |
| 2013/0042199 A1* | 2/2013 | Fong | G06F 3/0488 715/780 |
| 2013/0080264 A1* | 3/2013 | Umeda | G06Q 30/02 705/14.69 |
| 2013/0185164 A1* | 7/2013 | Pottjegort | G06Q 30/02 705/14.73 |
| 2013/0268351 A1* | 10/2013 | Abraham | G06Q 30/0246 705/14.45 |
| 2013/0305170 A1* | 11/2013 | de Souza | G06F 3/0485 715/760 |
| 2013/0325633 A1* | 12/2013 | McAfee | G06Q 30/02 705/14.68 |
| 2014/0279032 A1* | 9/2014 | Roever | G06Q 30/0267 705/14.64 |
| 2014/0298276 A1 | 10/2014 | Yokoyama et al. | |
| 2014/0365320 A1* | 12/2014 | Kanter | G06Q 30/0277 705/14.73 |
| 2015/0058114 A1* | 2/2015 | Yi | G06Q 30/0242 705/14.41 |
| 2015/0154650 A1* | 6/2015 | Umeda | G06Q 30/0273 705/14.68 |
| 2015/0170211 A1* | 6/2015 | de Souza | G06Q 30/0267 705/14.54 |
| 2015/0287097 A1* | 10/2015 | Umeda | G06Q 30/0275 705/14.71 |
| 2015/0310494 A1* | 10/2015 | Goldberg | G06Q 30/0267 705/14.64 |
| 2015/0310495 A1* | 10/2015 | Goldberg | G06Q 30/0267 705/14.43 |
| 2016/0180374 A1* | 6/2016 | Cetintas | G06Q 30/0244 705/14.43 |
| 2016/0219332 A1* | 7/2016 | Asbun | H04N 21/42201 |

FOREIGN PATENT DOCUMENTS

| | | |
|---|---|---|
| JP | 2012-243266 A | 12/2012 |
| JP | 2013-030114 A | 2/2013 |
| JP | 2014-096109 A | 5/2014 |
| JP | 2015-007832 A | 1/2015 |
| WO | 2013/080444 A1 | 6/2013 |

OTHER PUBLICATIONS

Nov. 24, 2015 Office Action issued in Japanese Patent Application No. 2015-148090.

Dec. 18, 2018 Office Action issued in Japanese Patent Application No. 2016-076664.

* cited by examiner

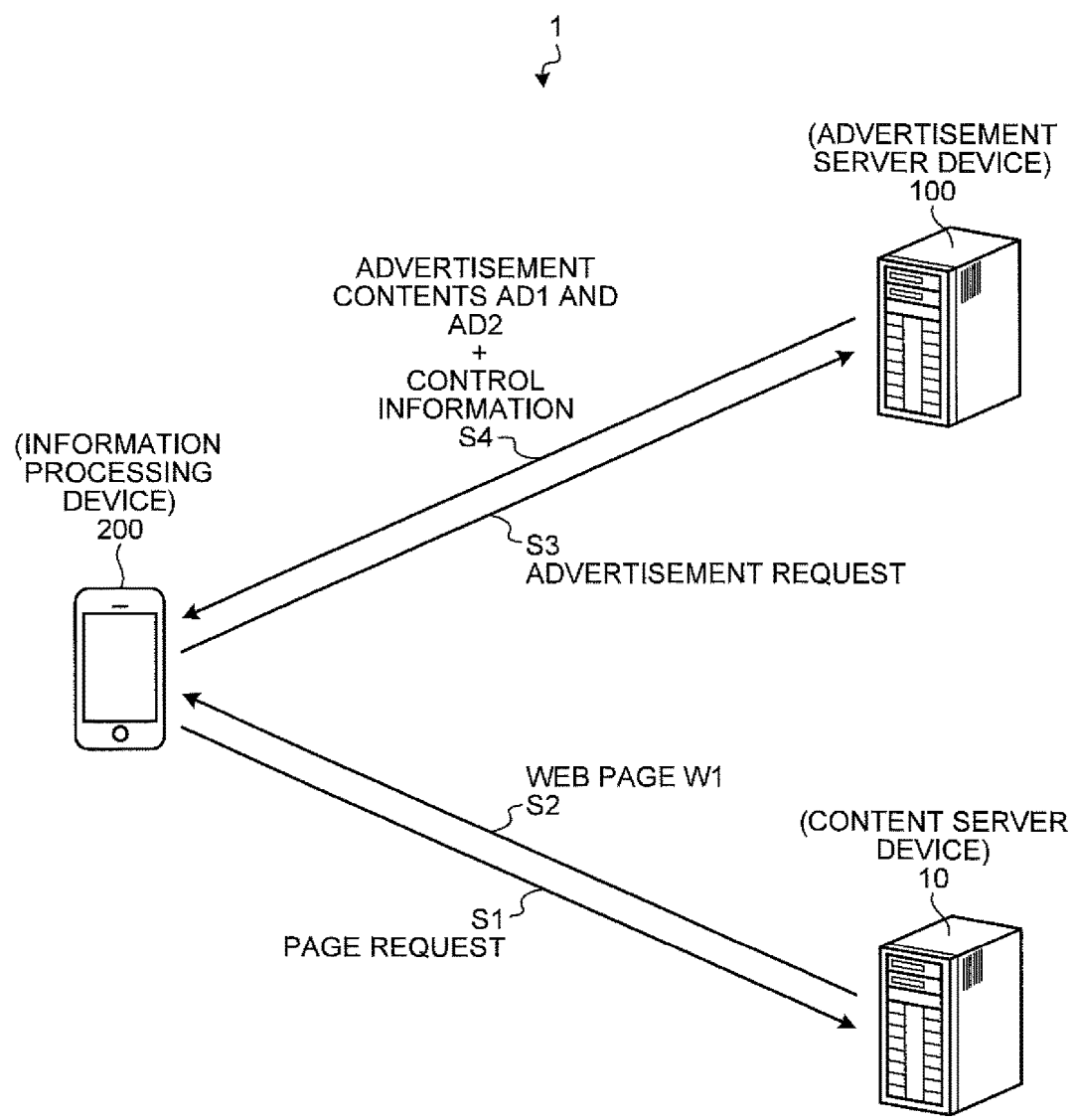

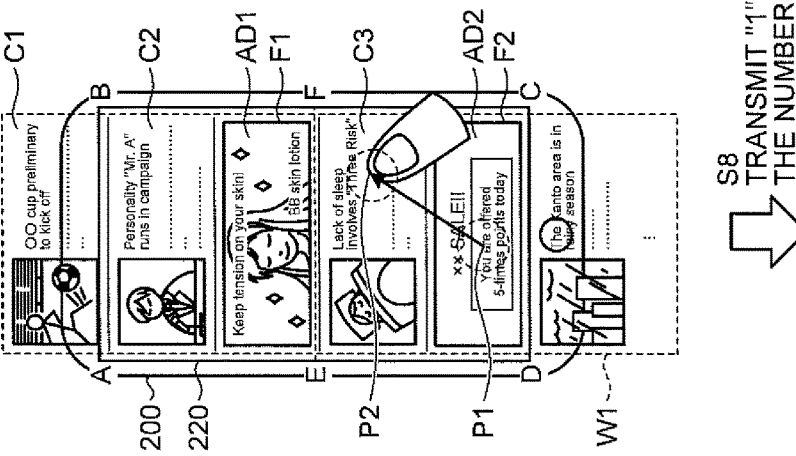
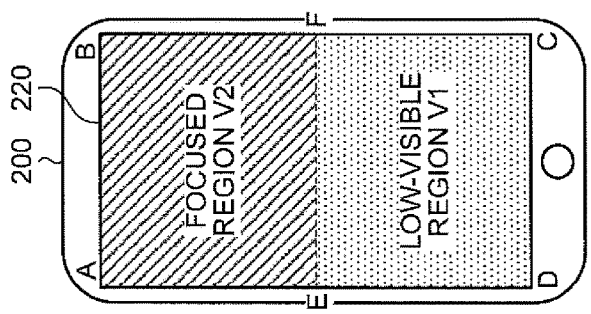
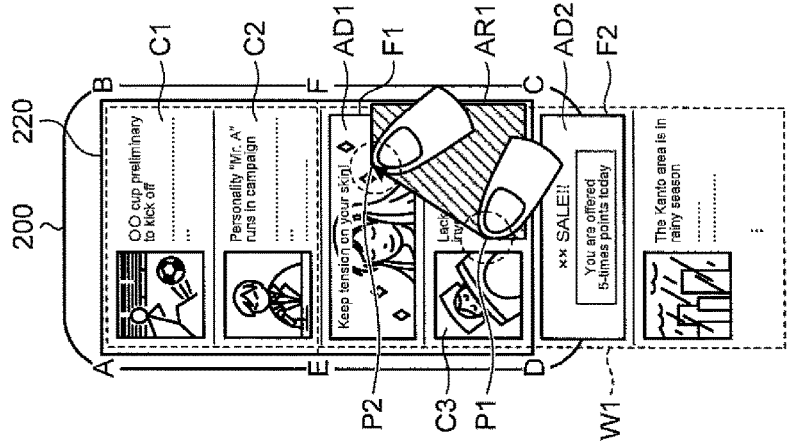

| ADVERTISE-MENT PROVIDER ID | ADVERTISE-MENT ID | ADVERTISE-MENT DATA | TOTAL NUMBER OF DISPLAY TIMES |
|---|---|---|---|
| T1 | AD1 | aaa.png | 1500 |
| T2 | AD2 | bbb.png | 1300 |
| T3 | AD3 | ccc.png | 1600 |
| ... | ... | ... | ... |

INFORMATION PROCESSING DEVICE, INFORMATION PROCESSING METHOD, NON-TRANSITORY COMPUTER READABLE STORAGE MEDIUM, AND DISTRIBUTION DEVICE

CROSS-REFERENCE TO RELATED APPLICATION(S)

The present application claims priority to and incorporates by reference the entire contents of Japanese Patent Application No. 2015-148090 filed in Japan on Jul. 27, 2015.

BACKGROUND OF THE INVENTION

1. Field of the Invention

The present invention relates to an information processing device, an information processing method, an information processing program, and a distribution device.

2. Description of the Related Art

Advertisement distribution through the Internet has become popular along with recent rapid spread of the Internet. In exemplary advertisement distribution, advertisement contents such as a company and a product are displayed in an advertisement space set on a web page, and a click on the advertisement contents causes a transition to a web page of an advertisement provider.

Many web pages have sizes larger than a size displayable on a terminal and a browser at once. On such a web page, depending on the display position of an advertisement, the advertisement does not appear in a region (referred to as a "display region") of the web page, which is visible by a user, before scrolled.

In a disclosed technique (for example, Japanese Laid-open Patent Publication No. 2012-160034), a state of each advertisement is notified as an exposure when the advertisement appears in the display region of the terminal, and a Click Through Rate (CTR) is calculated from the number of exposures notified from each terminal and click information captured based on, for example, redirecting and beacon.

In a case where contents, such as advertisement, are exposed in the display region, however, the user does not necessarily visually recognize the content. Thus, the above-described conventional technique cannot always determine display of contents when the contents are viewed by the user.

SUMMARY OF THE INVENTION

It is an object of the present invention to at least partially solve the problems in the conventional technology.

According to one aspect of an embodiment, an information processing device includes a detecting unit that detect a move operation to move contents displayed on a display screen of the information processing device. The information processing device includes a specifying unit that specify a focused region on which a user is focused for the display screen based on a result of the detection by the detecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating exemplary distribution processing according to an embodiment;

FIGS. 2A, 2B, and 2C are diagrams illustrating exemplary specifying processing according to the embodiment;

DETAILED DESCRIPTION OF THE PREFERRED EMBODIMENTS

Figures 3, 4:
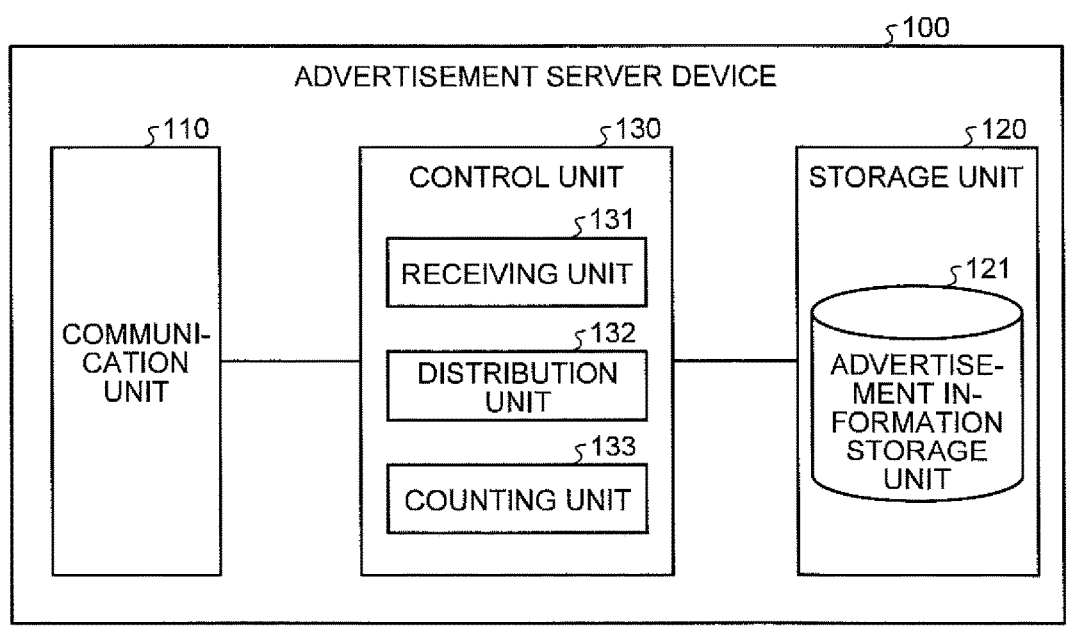
FIG. 3 is a diagram illustrating an exemplary configuration of an advertisement server device according to the embodiment.
FIG. 4 illustrates an exemplary advertisement information storage unit according to the embodiment.

Configurations (hereinafter, referred to as "embodiments") for achieving an information processing device, an information processing method, a non-transitory computer readable storage medium having stored therein an information processing program, and a distribution device according to the present application will be described in detail with reference to the accompanying drawings below. The embodiments does not limit the information processing device, the information processing method, and the information processing program according to the present application. In the embodiments below, identical components will be denoted by an identical reference numeral, and any duplicate description will be omitted.

1. Distribution Processing

Distribution processing according to an embodiment will be described with reference to FIG. 1. FIG. 1 is a diagram illustrating exemplary distribution processing according to the embodiment. In the example illustrated in FIG. 1, a distribution system 1 includes a content server device 10, an advertisement server device 100, and an information processing device 200. The content server device 10, the advertisement server device 100, and the information processing device 200 are connected with each other through a network so as to enable wireless or wired communication. The distribution system 1 illustrated in FIG. 1 may include a plurality of the content server devices 10, a plurality of the advertisement server devices 100, and a plurality of the information processing devices 200.

The content server device 10 distributes contents, for example, a web page including an advertisement space in which advertisement contents are displayed in response to a request from the information processing device 200. The advertisement server device 100 distributes advertisement contents including control information such as a script in response to a request from the information processing device 200. The advertisement server device 100 also counts the number of display times that advertisement contents have been displayed on the information processing device 200.

The information processing device 200 is a terminal device used by a user. Examples of the information processing device 200 include a tablet terminal, a personal computer (PC), a mobile phone, and a personal digital assistant (PDA).

The information processing device 200 also specifies a focused region on which the user is focused for a display unit 220 that is a display screen of the information processing device 200 based on control information included in advertisement contents received from the advertisement server device 100, and determines whether advertisement contents have been displayed in this focused region. Then, the information processing device 200 transmits the number of display times based on a result of the determination to the advertisement server device 100. The following first describes content distribution processing by the distribution system 1 in detail.

As illustrated in FIG. 1, the information processing device 200 first transmits a page request for a web page W1 to the content server device 10 in accordance with a user operation (step S1). In response to the page request from the information processing device 200, the content server device 10 distributes web data of the web page W1 to the information processing device 200 (step S2).

Having received the web data from the content server device 10, the information processing device 200 transmits an advertisement request for advertisement contents displayed in each advertisement space to the advertisement server device 100 because the received web data includes advertisement spaces F1 and F2 in which advertisement contents are displayed (step S3).

Having received the advertisement request from the information processing device 200, the advertisement server device 100 determines advertisement contents AD1 and AD2 as advertisement contents to be displayed in the advertisement spaces F1 and F2, and distributes the advertisement data and the control information on each of the advertisement contents AD1 and AD2 to the information processing device 200 (step S4). The determination processing of determining the advertisement contents may employ conventional methods such as content matching and user matching.

Having received the advertisement data, the information processing device 200 generates, based on the web data, the web page W1 on which the advertisement contents AD1 and AD2 are displayed in the advertisement spaces F1 and F2, and displays the generated web page W1.

2. Specifying Processing

The specifying processing according to the embodiment will be described next with reference to FIGS. 2A, 2B, and 2C. FIGS. 2A, 2B, and 2C are diagrams illustrating exemplary specifying processing according to the embodiment. FIG. 2A illustrates an example in which the web page W1 is displayed on the information processing device 200.

The web page W1 according to the present embodiment will be described. In the present the embodiment, the web page W1 includes a plurality of contents. Specifically, as illustrated in FIG. 2A, the web page W1 includes contents C1 to C3 such as newly arrived information and predetermined topics, and the advertisement contents AD1 and AD2.

In the present the embodiment, the web page W1 has a vertical size larger than the vertical size of the display unit 220. Thus, the user moves the web page W1, for example, upward to view contents currently not displayed on the display unit 220.

For example, as illustrated in FIG. 2A, the user performs a move operation (called a scroll operation, for example) to move a finger from a position P1 to a position P2 on the display unit 220 so as to move the web page W1. Having detected this move operation (step S5), the information processing device 200 specifies a low-visible region as a region in which the user's visibility on the display unit 220 is reduced by the move operation.

In the example in FIG. 2A, the information processing device 200 vertically divides Region ABCD corresponding to the display unit 220 into two regions of Region ABFE and Region CDEF. Then, having detected a move operation in Region CDEF that is the lower region, the information processing device 200 specifies Region CDEF as a low-visible region V1 in which the visibility is reduced by the move operation.

When a finger is moved from the position P1 to the position P2, for example, the finger in the scroll operation covers over the display unit 220, reducing the visibility of contents in a covered operation region AR1. When not performing a move operation or touching the display unit 220, the user is likely to place a thumb near the operation region AR1. Thus, it is expected that the user tends to view contents in Region ABFE not covered by the scroll operation rather than viewing contents in Region CDEF in which the visibility is reduced by the operation region AR1.

As illustrated in FIG. 2B, the information processing device 200 specifies Region CDEF as the low-visible region V1 in which the user's visibility is reduced based on such a user tendency so as to specify Region ABFE except for the low-visible region V1 as a focused region V2 on which the user is focused (step S6).

As illustrated in FIG. 2C, assume that the move operation from the position P1 to the position P2 has positioned the advertisement contents AD1 into the focused region V2. As described above, the user is likely to view contents in the focused region V2. Thus, the information processing device 200 determines that the advertisement contents AD1 have been displayed when the advertisement contents AD1 is positioned in the focused region V2 (step S7). Then, having determined that the advertisement contents AD1 have been displayed, the information processing device 200 transmits "1" for the number of display times of the advertisement contents AD1 to the advertisement server device 100 (step S8).

In this manner, the information processing device 200 specifies the low-visible region V1 in which the user's visibility is reduced by a move operation on the display unit 220, and specifies a region except for the low-visible region as the focused region V2. Then, the information processing device 200 determines display of advertisement contents positioned in the focused region V2, and transmits this determination result to the advertisement server device. This allows the information processing device 200 to determine display of contents highly possibly been viewed by the user, thereby achieving a higher accuracy of the number of display times.

3. Content Server Device

The content server device 10 is, for example, a web server configured to distribute contents such as a web page to the information processing device 200. For example, the content server device 10 distributes various web pages related to a news site, an auction site, a weather forecast site, a shopping site, a finance (share price) site, a service line search site, a map site, a travel site, a restaurant guide site, and a blog.

A web page distributed by the content server device 10 includes, for example, a HTML file written in Hyper Text Markup Language (HTML) or an XML file written in Extensible Markup Language (XML). A predetermined advertisement space is set to a web page distributed by the content server device 10, and the web page includes a command to acquire an advertisement to be displayed in the advertisement space. For example, the URL of the advertisement server device 100 is written as an advertisement acquisition command in an HTML file included in a web page. In this case, the information processing device 200 acquires advertisement contents from the advertisement server device 100 by accessing the URL written in, for example, the HTML file (transmitting an advertisement request).

Various kinds of actual web data distributed from the content server device 10 to the information processing device 200 is an HTML file and an image included in a web page. In the following, however, a "web page" refers to various kinds of web data distributed from the content server device 10 to the information processing device 200.

4. Advertisement Server Device

The advertisement server device 100 is a server device configured to distribute advertisement contents submitted from an advertisement provider. For example, having received an advertisement request for distribution of advertisement contents from the information processing device 200, the advertisement server device 100 determines advertisement contents to be displayed on the information processing device 200, and distributes the determined advertisement contents to the information processing device 200. The advertisement server device 100 is also a distribution device configured to distribute, to the information processing device 200, control information for causing the information processing device 200 to execute, for example, determination processing of specifying a focused region based on a usage manner of the information processing device 200 by the user and determining whether the contents have been displayed in the focused region. This control information is written in, for example, scripting language such as JavaScript (registered trademark) or Cascading Style Sheets (CSS). The advertisement server device 100 counts the number of display times that advertisement contents have been displayed on the information processing device 200.

The following describes the configuration of the advertisement server device 100 according to the embodiment with reference to FIG. 3. FIG. 3 is a diagram illustrating an exemplary configuration of the advertisement server device 100 according to the embodiment. As illustrated in FIG. 3, the advertisement server device 100 includes a communication unit 110, a storage unit 120, and a control unit 130.

The communication unit 110 is implemented with, for example, a network interface card (NIC). The communication unit 110 is connected with the network in a wired or a wireless manner to communicate information with the content server device 10 and the information processing device 200.

The storage unit 120 is implemented with, for example, a semiconductor memory element such as a random access memory (RAM) or a flash memory, or a storage device such as a hard disk or an optical disk. The storage unit 120 includes an advertisement information storage unit 121.

The advertisement information storage unit 121 is a storage unit configured to store therein various kinds of information on advertisement contents. Advertisement contents include an image and a moving image related to advertisement information. FIG. 4 illustrates an example of the advertisement information storage unit 121 according to the embodiment. In the example in FIG. 4, the advertisement information storage unit 121 has items such as "Advertisement Provider ID", "Advertisement ID", "Advertisement Data", and "Total Number of Display Times".

"Advertisement Provider ID" is identification information for identifying the advertisement provider or a terminal device used by the advertisement provider. "Advertisement ID" is identification information for identifying advertisement contents. "Advertisement Data" is data of the advertisement contents. In the example in FIG. 4, the advertisement data is represented by abstract symbols, but in reality, the advertisement data is image data and movie data related to the advertisement contents, for example. "Total Number of Display Times" indicates the total number of display times that each of the advertisement contents have been displayed on the information processing device 200.

Thus, FIG. 4 illustrates an example in which an advertisement provider identified by an advertisement provider ID "T1" submits advertisement data "aaa.png" identified by an advertisement ID "AD1". In the illustrated example, advertisement contents identified by the advertisement ID "AD1" have been displayed "1500" times.

In the following embodiment, advertisement contents are distinguished by their advertisement IDs in some cases. For example, an advertisement content identified by the advertisement ID "AD1" may be referred to as the advertisement contents AD1. The advertisement information storage unit 121 may have, for example, items of "Unit Bid Price" and "Targeting Condition" in addition to the items illustrated in FIG. 4. In this case, "Unit Bid Price" is the unit amount of money charged on the advertisement provider by an advertisement distributor (for example, an administrator of the advertisement server device 100) when advertisement contents are clicked. "Targeting Condition" is a condition for specifying a distribution destination user to which advertisement contents are distributed, and includes, for example, user attributes such as sex and age.

In FIG. 3, the control unit 130 is implemented with, for example, a central processing unit (CPU) or a micro processing unit (MPU) executing various computer programs (corresponding to an exemplary distribution program, for example) stored in a storage device in the advertisement server device 100 by using a random access memory (RAM) as a work area. The control unit 130 is also implemented with, for example, integrated circuits such as an application specific integrated circuit (ASIC) and a field-programmable gate array (FPGA).

As illustrated in FIG. 3, the control unit 130 includes a receiving unit 131, a distribution unit 132, and a counting unit 133, and achieves or executes the functionality and advantageous effects of information processing described below. The internal configuration of the control unit 130 is not limited to the configuration illustrated in FIG. 3, but may be any other configuration capable of performing the information processing to be described later. A connection relation between the processing units included in the control unit 130 is not limited to the connection relation illustrated in FIG. 3, but may be any other connection relation.

The receiving unit 131 receives submission of advertisement contents from the terminal device of the advertisement provider. Then, the receiving unit 131 stores an advertisement ID and advertisement data in association with the advertisement provider ID of the advertisement provider as a submitter in the advertisement information storage unit 121. The receiving unit 131 may additionally receive an advertisement request from the information processing device 200.

The distribution unit 132 distributes advertisement contents. Specifically, upon reception of an advertisement request of by the receiving unit 131, the distribution unit 132 determines advertisement contents as a distribution target to be distributed to the information processing device 200. Then, the distribution unit 132 distributes data of the advertisement contents determined as the distribution target to the information processing device 200. The distribution unit 132 distributes control information along with the advertisement contents.

The counting unit 133 counts the number of display times that the advertisement contents have been displayed on the information processing device 200. Specifically, having received a predetermined value as the number of display times of the advertisement contents from a transmitting unit 237 of the information processing device 200 to be described later, the counting unit 133 registers the sum of the received predetermined value and the current number of display times into a cell of "Total Number of Display Times" in the advertisement information storage unit 121. This registration is described next with reference to an example.

For example, assume that the counting unit 133 has received, from the transmitting unit 237, information on the number of display times (hereinafter referred to as "display times information") such as "Advertisement ID: AD1 and Number of Display Times: 1". Also assume that, as illustrated in FIG. 4, the total number of display times that the advertisement contents AD1 has been displayed is "1500". In this case, the counting unit 133 registers "1501" as the sum of "1500" for the total number of display times and "1" for the number of display times corresponding to the advertisement ID "AD1".

In the present the embodiment, the predetermined value for the number of display times is "1", but a value ("0.5", for example) smaller than the predetermined value "1" is transmitted by the transmitting unit 237 in some cases. Having received "0.5" for the number of display times, the counting unit 133 may add the received "0.5" for the number of display times to the current total number of display times. Description on such a case will be given later.

5. Information Processing Device

The information processing device 200 specifies the focused region V2 on which the user is focused for the display unit 220 from the usage manner of the device by the user based on the control information received along with the advertisement contents from the advertisement server device 100. Then, the information processing device 200 determines whether the contents have been displayed in the focused region. The information processing device 200 transmits the number of display times based on a result of the determination to the advertisement server device 100.

Figure 5:
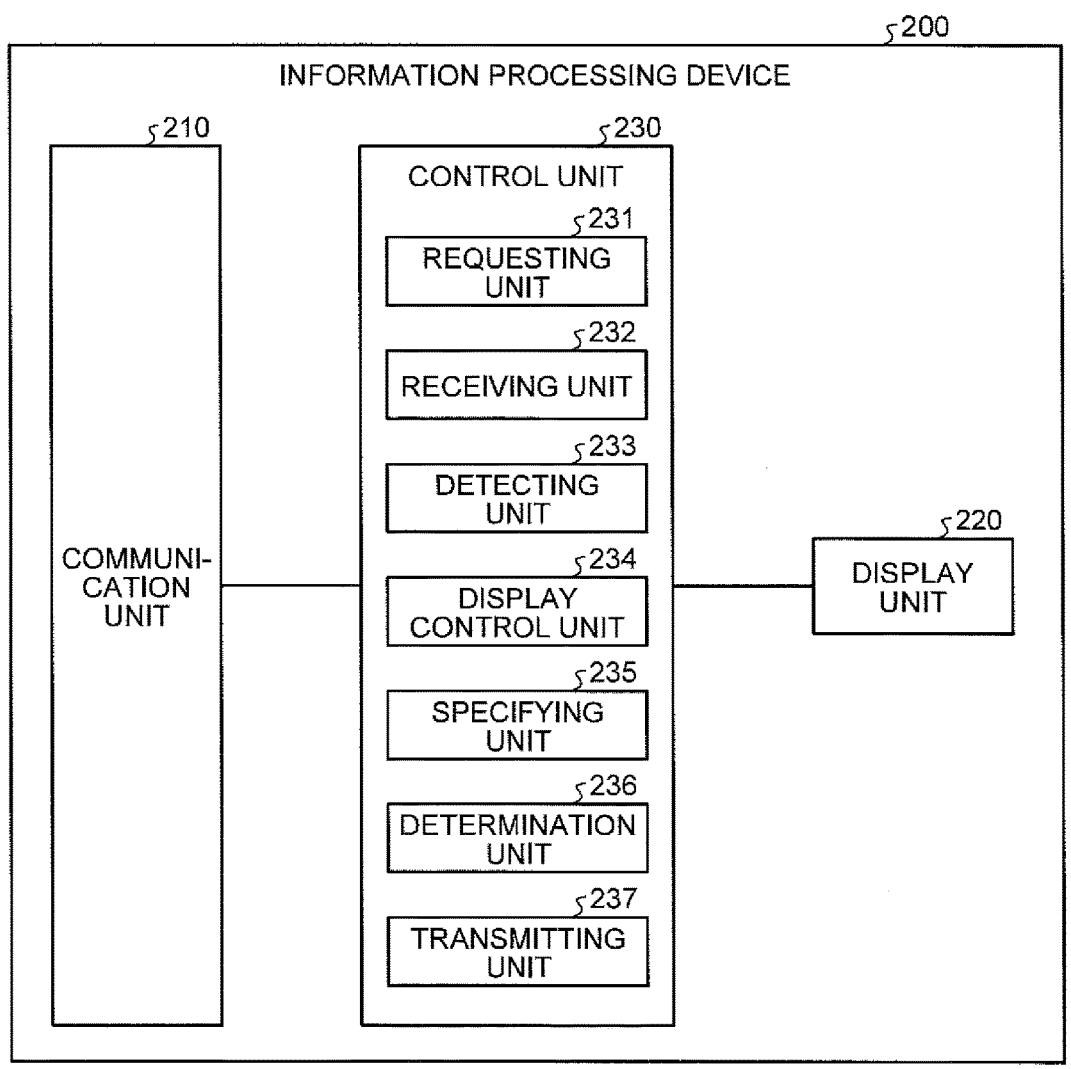
FIG. 5 is a diagram illustrating an exemplary configuration of an information processing device according to the embodiment.

The configuration of the information processing device 200 according to the embodiment will be described next with reference to FIG. 5. FIG. 5 is a diagram illustrating an exemplary configuration of the information processing device 200 according to the embodiment. As illustrated in FIG. 5, the information processing device 200 includes a communication unit 210, the display unit 220, and a control unit 230.

The communication unit 210 is implemented with, for example, an NIC. The communication unit 210 is connected with the network in a wired or a wireless manner to communicate between with the content server device 10 and the advertisement server device 100.

The display unit 220 is a display device configured to display various kinds of information. For example, the display unit 220 is implemented with a liquid crystal display. In other words, the display unit 220 is a display screen of the information processing device 200. In the present the embodiment, the display unit 220 is a touch panel.

The control unit 230 is implemented with, for example, a CPU or an MPU executing various computer programs stored in the storage device in the information processing device 200 by using the RAM as a work area. The control unit 230 is also implemented with, for example, integrated circuits such as an ASIC and an FPGA.

As illustrated in FIG. 5, the control unit 230 includes a requesting unit 231, a receiving unit 232, a detecting unit 233, a display control unit 234, a specifying unit 235, a determination unit 236, and the transmitting unit 237, and achieves or executes the functionality and advantageous effects of the information processing described below. The internal configuration of the control unit 230 is not limited to the configuration illustrated in FIG. 5, but may be any other configuration capable of performing the information processing to be described later. A connection relation between the processing units included in the control unit 230 is not limited to the connection relation illustrated in FIG. 5, but may be any other connection relation. The detecting unit 233, the specifying unit 235, the determination unit 236, and the transmitting unit 237 are components generated by the control unit 230 executing the above-described control information.

The requesting unit 231 transmits, to the content server device 10, a page request for distribution of a web page in accordance with a user operation. The requesting unit 231 also transmits, to the advertisement server device 100, an advertisement request for distribution of advertisement contents if an advertisement acquisition command is included in a web page received by the receiving unit 232.

The receiving unit 232 receives data of various contents. For example, the receiving unit 232 receives data of a web page (web data) and advertisement contents (advertisement data). The receiving unit 232 may also perform processing of generating a web page in accordance with received data and displaying the generated web page on the display unit 220.

The detecting unit 233 detects the usage manner of the device, or the information processing device 200, by the user. Specifically, the detecting unit 233 detects, as the usage manner of the user, a move operation to move contents displayed on the display unit 220. For example, having detected a touch operation on the display unit 220 by the user, the detecting unit 233 detects, as a move operation, a change of a touched position while detecting the touch operation. This processing will be described with reference to an example in which the user performs a move operation to move a finger from the position P1 to the position P2 on the display unit 220 so as to move the web page W1 as illustrated in FIG. 2A.

In the example in FIG. 2A, the detecting unit 233 first detects a touch operation on the position P1. Then, when the user moves the finger from the position P1 while touching on the display unit 220 so as to move the web page W1, the detecting unit 233 detects the touched position has changed from the position P1 while detecting the touch operation. The detecting unit 233 detects this change of the touched position as a move operation. The detecting unit 233 also continuously acquires the coordinates of the touched position on the display unit 220 in response to the change of the touched position by the move operation, and stores the acquired coordinates in, for example, a predetermined buffer. When the user moves the finger to the position P2 and moves the finger off the display unit 220, the detecting unit 233 stops detecting the touch operation, and accordingly determines that the move operation has ended.

The display control unit 234 controls the display manner of contents on the display unit 220. Specifically, when the detecting unit 233 has detected a move operation to move contents, the display control unit 234 moves the contents in accordance with the move operation. For example, upon continuous acquisition of a change of a touched position due to the move operation as coordinates by the detecting unit 233, the display control unit 234 moves the contents by a distance in accordance with the move operation based on the acquired coordinates. This processing will be described next with reference to FIGS. 2A, 2B, and 2C.

For example, as illustrated in FIG. 2A, assume that a move operation to move a finger from the position P1 to the position P2 on the display unit 220 so as to move the web page W1 has been detected. The coordinates of the position P1 is represented by (x1, y1), and the coordinates of the position P2 is represented by (x2, y2). In this case, the web page W1 has a horizontal size equal to that of the display unit 220 and a vertical size longer than that of the display unit 220, and thus the display control unit 234 moves the web page W1 upward by a distance calculated by, for example, y2−y1. Alternatively, the display control unit 234 may move the web page W1 by the distance between the position P1 and the position P2 based on the coordinates acquired by the detecting unit 233.

In FIG. 5, the specifying unit 235 specifies a focused region on which the user is focused for the display unit 220 based on a result of detection by the detecting unit 233. Specifically, for each reception of various contents by the receiving unit 232, when a move operation is detected by the detecting unit 233, the specifying unit 235 specifies, based on a detected position of the detected move operation, the low-visible region V1 in which the user's visibility is reduced by the move operation on the display unit 220, and then specifies a region except for the low-visible region V1 as the focused region V2. Alternatively, the specifying unit 235 may be a predicting unit configured to predict the low-visible region V1 so as to predict a region except for the low-visible region V1 as the focused region V2.

For example, when a change of a touched position in accordance with the move operation is continuously acquired as coordinates on the display unit 220 by the detecting unit 233, the specifying unit 235 receives, from the detecting unit 233, the coordinates of the touched position acquired between the start and the end of the move operation as a detected position on which the move operation is detected. Then, the specifying unit 235 specifies a region including the received detected position on the display unit 220, and specifies this region as the low-visible region V1 so as to specify a region except for the low-visible region V1 as the focused region V2. In the following, the coordinates received as the detected position may be referred to as a "move-operation indicating coordinates".

Figure 6:
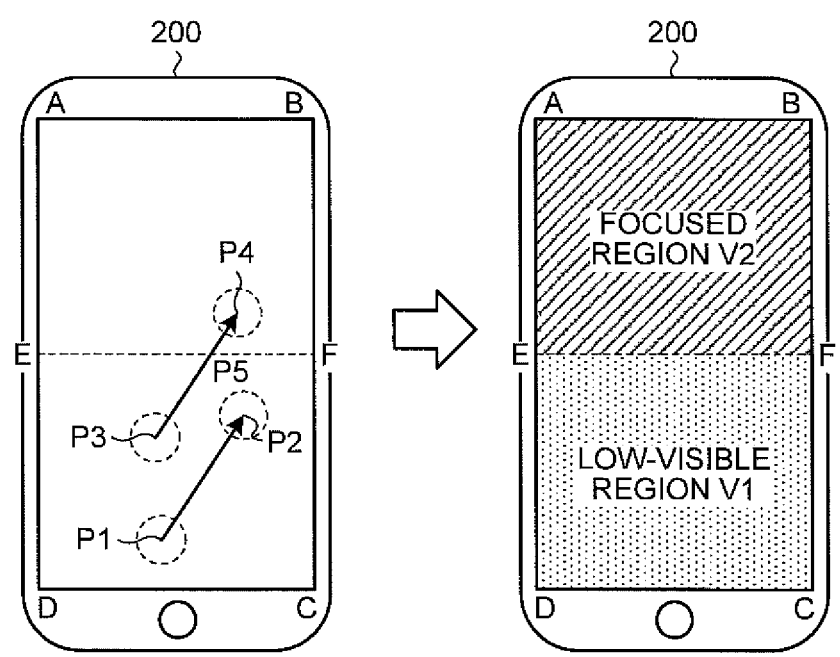
FIG. 6 is a diagram illustrating exemplary region specifying processing according to the embodiment.

The processing of specifying, by the specifying unit 235, a region including a detected position on which a move operation is detected will be described next with reference to FIG. 6. FIG. 6 is a diagram illustrating exemplary region specifying processing according to the embodiment. The specifying unit 235 specifies a region including the detected position from among Region ABFE and Region CDEF obtained by vertically dividing Region ABCD corresponding to the display unit 220 into two regions. Specifically, the specifying unit 235 determines whether all pairs of coordinates indicating the detected position exist in either of Region ABFE and Region CDEF. Having determined that all coordinates indicating the detected position exist in either region, the specifying unit 235 specifies a region in which the coordinates indicating the detected position exist as the region including the detected position. Having determined that not all coordinates indicating the detected position are positioned in either region, in other words, the coordinates indicating the detected position exist in both of Region ABFE and Region CDEF, the specifying unit 235 specifies a region including a larger number of coordinates indicating the detected position as the region including the detected position.

For example, as illustrated in FIG. 2A, assume that a move operation is performed to move a finger from the position P1 to the position P2 on the display unit 220 so as to move the web page W1. When a straight line connecting the position P1 and the position P2 represents a locus on which the finger in touch with the display unit 220 is moved, the detecting unit 233 continuously acquires coordinates on this straight line in accordance with the move operation. The specifying unit 235 receives, from the detecting unit 233, the acquired coordinates as a detected position on which the move operation is detected, and specifies which of Region ABFE and Region CDEF includes the detected position. In this case, all move-operation indicating coordinates exist in Region CDEF, and thus the specifying unit 235 specifies Region CDEF as a region including the move operation.

For example, when a move operation to move a finger from a position P3 to a position P4 is performed, the specifying unit 235 determines that coordinates indicating a detected position exist in both of Region ABFE and Region CDEF because this move operation is performed across Region ABFE and Region CDEF. In the example illustrated in FIG. 6, a move operation is performed more in Region CDEF than in Region ABFE, in other words, the move-operation indicating coordinates exists a larger number in Region CDEF. Thus, the specifying unit 235 specifies Region CDEF as a region including the move operation.

Having determined that the coordinates indicating the detected position exist in both of Region ABFE and Region CDEF, the specifying unit 235 may specify a region including the detected position based on a travel distance correspond to the move operation. For example, as illustrated in FIG. 6, the specifying unit 235 may specify Region CDEF including straight line P3-P5 having a longer distance as a region including the detected position from among straight line P3-P5 and straight line P4-P5, where P5 represents an intersection point of a straight line connecting the position P3 and the position P4 and a line segment EF that is a boundary line between Region ABFE and Region CDEF.

Having determined that the coordinates indicating the detected position exist in both of Region ABFE and Region CDEF, the specifying unit 235 may specify a region including the starting point of the move operation as a region including the detected position. For example, in the move operation to move the finger from the position P3 to the position P4, the specifying unit 235 specifies Region CDEF including the position P3 that is the starting point of the move operation as a region including the detected position.

The following describes a low-visible region and a visible region in the present embodiment. When a finger is moved from the position P1 to the position P2, for example, the finger in the scroll operation covers over the display unit 220, reducing the visibility of contents in the operation region AR1 as the covered region. When not performing a move operation or touching the display unit 220, the user is likely to place a thumb near the operation region AR1. Thus, it is expected that the user naturally tends to view contents in Region ABFE that is a region not covered by the scroll operation rather than viewing contents in Region CDEF in which the visibility is reduced by the operation region AR1. As illustrated in FIG. 2B, the specifying unit 235 specifies Region CDEF as the low-visible region V1 based on such a user tendency so as to specify Region ABFE except for the low-visible region V1 as the focused region V2.

The determination unit 236 determines whether contents have been displayed in the focused region V2. Specifically, the determination unit 236 determines whether advertisement contents have been displayed as the contents in the focused region V2. For example, after the focused region V2 is specified by the specifying unit 235, the determination unit 236 determines whether the advertisement contents have been displayed in the focused region V2 based on the state of the advertisement contents in the focused region V2.

For example, as the state of the advertisement contents, the determination unit 236 determines that the advertisement contents have been displayed in the focused region V2 if the focused region V2 has continuously included 50% or more of the area of the advertisement contents for one second or longer. This processing will be described next with reference to FIGS. 2A, 2B, and 2C.

As illustrated in FIGS. 2A and 2B, assume that the specifying unit 235 specifies Region ABFE on the display unit 220 as the focused region V2 upon the move operation to move the finger from the position P1 to the position P2 so as to move the web page W1. Also assume that, due to this move operation, the advertisement contents AD1 has become completely included in the focused region V2 and stayed there for one second or longer as illustrated in FIG. 2C. In this case, the determination unit 236 determines that the advertisement contents AD1 have been displayed in the focused region V2. Then, the determination unit 236 transmits a notification of the display of the advertisement contents AD1 in the focused region V2 to the transmitting unit 237.

The determination unit 236 may determine whether advertisement contents have been displayed in the low-visible region V1. For example, if the low-visible region V1 continuously has included 50% or more of the area of the advertisement contents for one second or longer, the determination unit 236 determines that the advertisement contents have been displayed in the low-visible region V1.

For example, in FIG. 2C, the advertisement contents AD2 are completely included in the low-visible region V1 due to the move operation from the position P1 to the position P2. Assume that such a state has lasted for one second or longer. In this case, the determination unit 236 determines that the advertisement contents AD2 have been displayed in the low-visible region V1. Then, the determination unit 236 transmits a notification of the display of the advertisement contents AD2 in the low-visible region V1 to the transmitting unit 237.

Assume that another move operation has moved the advertisement contents AD2 from the low-visible region V1 to the focused region V2. In this case, the determination unit 236 performs the above-described processing to determine that the advertisement contents AD2 have been displayed in the focused region V2. Then, the determination unit 236 transmits a notification of the display of the advertisement contents AD2 in the focused region V2 to the transmitting unit 237.

The determination unit 236 desirably performs a single determination of display in the focused region V2 for advertisement contents distributed in response to a single advertisement request. For example, in FIGS. 2A, 2B, and 2C, the advertisement contents AD1 and AD2 are advertisement contents distributed from the advertisement server device 100 in response to a single advertisement request by the requesting unit 231. The above example illustrates that the determination unit 236 determines that these advertisement contents have been displayed in the focused region V2.

For example, assume that the advertisement contents AD1 has been moved out of the focused region V2 by an upward move operation and become completely included again in the focused region V2 by a downward move operation. In such a case, the determination unit 236 is desirably configured not to determine again that the advertisement contents AD1 have been displayed in the focused region V2. This does not apply, however, to a case in which, for example, the web page W1 has been closed and distributed again to distribute the advertisement contents AD1. Such processing is exemplary, and the determination unit 236 may determine that advertisement contents have been displayed a plurality of times in response to a move operation.

The transmitting unit 237 transmits a result of the determination by the determination unit 236 to the advertisement server device 100. Specifically, the transmitting unit 237 transmits the predetermined value as the number of display times to the advertisement server device 100 if the determination unit 236 determines that advertisement contents have been displayed in the focused region V2. The transmitting unit 237 transmits a value smaller than the predetermined value as the number of display times to the advertisement server device 100 if the determination unit 236 determines that the advertisement contents have been displayed in the low-visible region V1. Alternatively, the transmitting unit 237 transmits the predetermined value to the advertisement server device 100 if the determination unit 236 determines that the advertisement contents have been displayed in the low-visible region V1 and then moved in response to a move operation to be displayed in the focused region V2. This processing will be described next with reference to FIGS. 2A, 2B, and 2C.

For example, having received the notification of the display of the advertisement contents AD1 in the focused region V2 from the determination unit 236, the transmitting unit 237 transmits the advertisement ID "AD1" in association with "1" for the number of display times to the advertisement server device 100. Alternatively, having received the notification of the display of the advertisement contents AD2 in the low-visible region V1 from the determination unit 236, the transmitting unit 237 transmits the advertisement ID "AD2" in association with, for example, "0.5" as a value smaller than "1" for the number of display times to the advertisement server device 100. Alternatively, having received a notification of display of the advertisement contents AD2 in the low-visible region V1 followed by display of the advertisement contents AD2 in the focused region V2 due to the motion in response to a move operation, the transmitting unit 237 transmits the advertisement ID "AD2" in association with "1" for the number of display times to the advertisement server device 100.

The user is likely to view contents in the focused region V2 that is unlikely to be affected by, for example, the move operation so that contents are more easily viewed therein, rather than contents in the low-visible region V1 in which the visibility is reduced by a usage manner such as a move operation on the information processing device 200. Thus, if the determination unit 236 determines that advertisement contents have been displayed in the focused region V2, the contents are likely to be have been viewed by the user, and thus the transmitting unit 237 transmits "1" for the number of display times. When displayed in the low focused region V1, the advertisement contents are still sufficiently likely to be viewed by the user to some extent which is not the same as when the advertisement contents are displayed in the focused region V2. Thus, if it is determined that the advertisement contents have been displayed in the low-visible region V1, the transmitting unit 237 transmits a value smaller than "1" for the number of display times.

6. Processing Procedure

Figure 7:
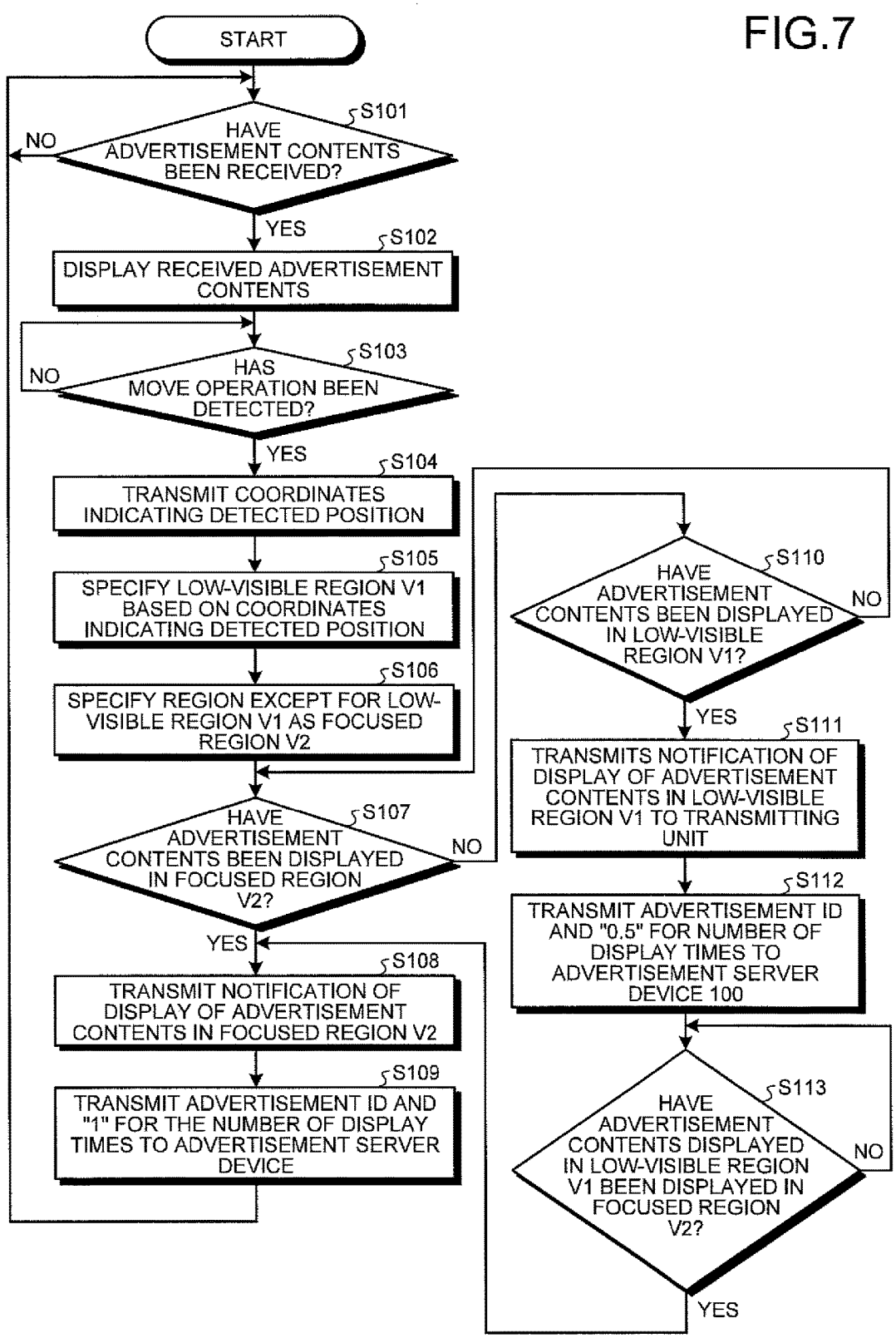
FIG. 7 is a flowchart of an exemplary procedure of the specifying processing according to the embodiment.

The following describes the procedure of the specifying processing according to the embodiment with reference to FIG. 7. FIG. 7 is a flowchart of an exemplary procedure of the specifying processing according to the embodiment.

First, the receiving unit 232 determines whether advertisement contents have been received (step S101). Having determined that no advertisement contents have been received (No at step S101), the receiving unit 232 waits for the reception. Having received advertisement contents (Yes at step S101), the receiving unit 232 displays the received advertisement contents on the display unit 220 (step S102).

Next, the detecting unit 233 determines whether a move operation to move the web page W1 has been detected (step S103). Not having detected the move operation (No at step S103), the detecting unit 233 waits for detection of the move operation. Having detected the move operation (Yes at step S103), the detecting unit 233 transmits coordinates indicating a detected position on which the move operation has been detected to the specifying unit 235 (step S104).

The specifying unit 235 specifies the low-visible region V1 based on the coordinates indicating the detected position received from the detecting unit 233 (step S105). For example, the specifying unit 235 specifies which of Region ABFE and Region CDEF dividing the display unit 220 in half includes the coordinates indicating the detected position continuously acquired by the detecting unit 233 between the start and the end of the move operation, and specifies the specified region as the low-visible region V1. The specifying unit 235 also specifies a region except for the low-visible region V1 as the focused region V2 (step S106).

Next, the determination unit 236 determines whether advertisement contents have been displayed in the focused region V2 (step S107). For example, if the focused region V2 has continuously included 50% or more of the area of the advertisement contents for one second or longer, the determination unit 236 determines that the advertisement contents have been displayed in the focused region V2. Then, having determined that the advertisement contents have been displayed in the focused region V2 (Yes at step S107), the determination unit 236 transmits a determination result that the advertisement contents have been displayed in the focused region V2 to the transmitting unit 237 (step S108). The transmitting unit 237 transmits the advertisement ID of the advertisement contents determined to have been displayed in the focused region V2 by the determination unit 236 in association with "1" for the number of display times to the advertisement server device 100 (step S109).

Having determined that the advertisement contents have not been displayed in the focused region V2 (No at step S107), the determination unit 236 determines whether the advertisement contents have been displayed in the low-visible region V1 (step S110). For example, if the low-visible region V1 has continuously included 50% or more of the area of the advertisement contents for one second or longer, the determination unit 236 determines that the advertisement contents have been displayed in the low-visible region V1.

Having determined that the advertisement contents have not been displayed in the low-visible region V1 (No at step S110), the determination unit 236 returns to step S107. Having determined that the advertisement contents have been displayed in the low-visible region V1 (Yes at step S110), the determination unit 236 transmits a determination result that the advertisement contents have been displayed in the low-visible region V1 to the transmitting unit 237 (step S111). The transmitting unit 237 transmits the advertisement ID of the advertisement contents determined to have been displayed in the low-visible region V1 by the determination unit 236 in association with "0.5" for the number of display times to the advertisement server device 100 (step S112).

The determination unit 236 also determines whether the advertisement contents determined to have been displayed in the low-visible region V1 have been displayed in the focused region V2 (step S113). Having determined that the advertisement contents have not been displayed in the focused region V2 (No at step S113), the determination unit 236 waits for the display. Having determined that the advertisement contents have been displayed in the focused region V2 (Yes at step S113), the determination unit 236 transmits a determination result that the advertisement contents have been displayed in the focused region V2 to the transmitting unit 237 (step S108). The transmitting unit 237 transmits the advertisement ID of the advertisement contents determined to have been displayed in the focused region V2 by the determination unit 236 in association with "1" for the number of display times to the advertisement server device 100 (step S109).

7. Modification

The information processing device 200 according to the embodiment may be achieved in various kinds of different configuration other than the embodiment. The following describes other embodiments of the information processing device 200.

7-1. Move Operation Frequency

The above-described embodiment describes the example in which the specifying unit 235 of the information processing device 200 specifies the low-visible region V1 based on a detected position on which a move operation is detected by the detecting unit 233. However, the specifying unit 235 may specify the focused region V2 based on an operation frequency at which a move operation is performed. Specifically, if a move operation is performed in a predetermined region of the display unit 220 at an operation frequency equal to or larger than a predetermined value, the specifying unit 235 specifies a region except for the predetermined region as the focused region V2.

For example, the specifying unit 235 calculates the number of move operations performed in a predetermined time as the operation frequency, when one move operation is defined by the start and the end of a move operation. Then, the specifying unit 235 specifies, as the low-visible region V1, a region for which the calculated operation frequency satisfies a predetermined condition. This processing will be described next with reference to FIGS. 2A, 2B, and 2C.

For example, the predetermined condition is "three move operations or more in three seconds". Upon start of a move operation, having received coordinates indicating a detected position from the detecting unit 233, the specifying unit 235 starts counting a clock. Upon end of the move operation, having stopped receiving the coordinates indicating the detected position from the detecting unit 233, the specifying unit 235 sets the number of move operations to "1" and specifies which of Region ABEF or Region CDEF the move operation has been performed. If another move operation has been started and ended, the specifying unit 235 sets the number of move operations to "2" and specifies which of Region ABEF or Region CDEF the move operation has been performed. The specifying unit 235 repeats this operation, and ends counting the clock and the number of move operations when three seconds have passed.

Assume that the specifying unit 235 has specified based on collected counting results that six move operations were performed in three seconds and four of these six move operations were performed in Region CDEF. Accordingly, the specifying unit 235 determines that the move operations have been performed in Region CDEF at an operation frequency satisfying the predetermined condition of "three move operations or more in three seconds", and specifies Region CDEF as the low-visible region V1.

In this manner, the information processing device 200 specifies the low-visible region V1 based on the operation frequency of move operations. This enables the information processing device 200 to specify, as the low-visible region V1, a region in which the user is likely to perform a move operation on the display unit 220, thereby more accurately specifying the focused region V2.

The method of calculating the operation frequency described in the modification is exemplary, and the operation frequency may be calculated in other methods. For example, the specifying unit 235 may calculate, as the operation frequency, a ratio of the number of move operations in each region relative to the total number of move operations performed in a predetermined time, and specify a region the calculated operation frequency of which is equal to or larger than a predetermined ratio as the low-visible region V1.

7-2. Focused Region

The specifying unit 235 may specify the entire display unit 220 as a focused region if a move operation has been detected in a plurality of regions in the display unit 220. For example, if a move operation has been detected in a plurality of regions in the display unit 220 in a predetermined time, the specifying unit 235 specifies the entire display unit 220 as a focused region. This processing will be described next with reference to FIG. 8.

Figure 8:
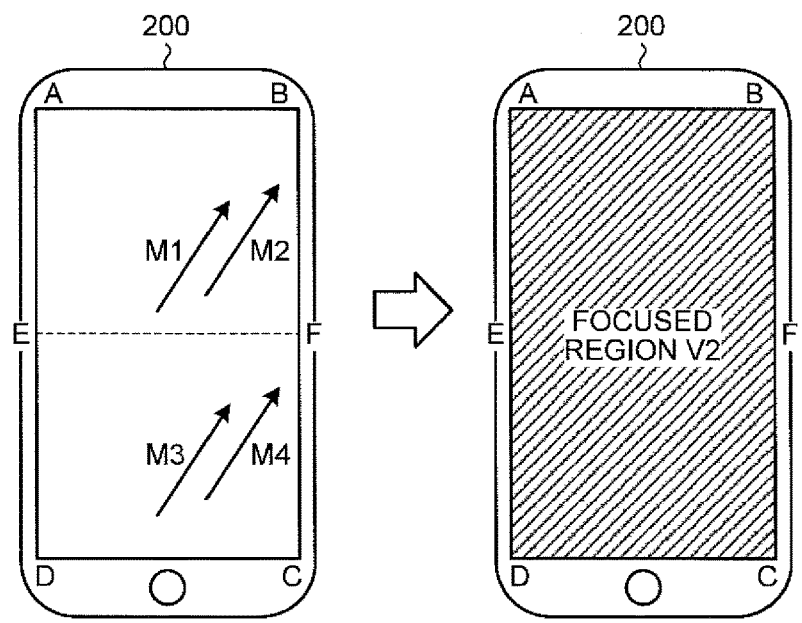
FIG. 8 is a diagram illustrating exemplary focused region specifying processing according to a modification.

FIG. 8 is a diagram illustrating exemplary focused region specifying processing according to the modification. For example, the predetermined time is "30 seconds". Assume that a move operation M1 has been started as an initial move operation. In response to the start of the move operation M1, the specifying unit 235 starts counting a clock. Then, after the move operation M1 has been ended, the specifying unit 235 specifies that the move operation M1 has been performed in Region ABCD. Subsequently, when a move operation M2 has been performed, the specifying unit 235 specifies that the move operation M2 has been performed in Region ABCD. When a move operation M3 has been performed, the specifying unit 235 specifies that the move operation M3 has been performed in Region CDEF. When a move operation M4 has been performed, the specifying unit 235 specifies that the move operation M4 has been performed in Region CDEF.

Assume that "30 seconds" have passed when the move operation M4 has been performed. Then, the specifying unit 235 collects results of determination of which of Region ABCD or Region CDEF each of the move operation M1 to M4 performed in "30 seconds" has been performed in. Accordingly, the specifying unit 235 specifies that the move operations have been performed in both of Region ABCD and Region CDEF in "30 seconds". Thus, as illustrated in FIG. 8, the specifying unit 235 specifies the entire display unit 220 as the focused region V2.

As illustrated in FIG. 8, move operations dispersively performed in a plurality of regions indicate that the user is likely to view various parts on the display unit 220. In this case, instead of specifying a particular region as the focused region V2, the information processing device 200 can specify the entire display unit 220 as the focused region V2 in a flexible manner in accordance with characteristics of the user.

The specifying unit 235 may further take into account the number of move operations. Specifically, if a predetermined number of move operations or more have been detected in a plurality of regions on the display unit 220 in a predetermined time, the specifying unit 235 may specify the entire display unit 220 as a focused region. The above example describes that the specifying unit 235 specifies the entire display unit 220 as the focused region V2 if move operations have been performed in both of Region ABCD and Region CDEF in "30 seconds". For example, "three times or more" may be further set as a predetermined number of times. In this case, the specifying unit 235 specifies the entire display unit 220 as the focused region V2 if move operations have been performed "three times or more" in Region ABCD and Region CDEF in "30 seconds".

7-3. Region Corresponding to Display Unit

The above-described embodiments describe the example in which the specifying unit 235 specifies the low-visible region V1 and the focused region V2 based on Region ABFE and Region CDEF vertically dividing Region ABCD corresponding to the display unit 220 in half. However, the specifying unit 235 does not necessarily need to use two regions, but may use an optional number of regions, for example, three or four regions. This configuration will be described next with reference to FIG. 9.

Figure 9:
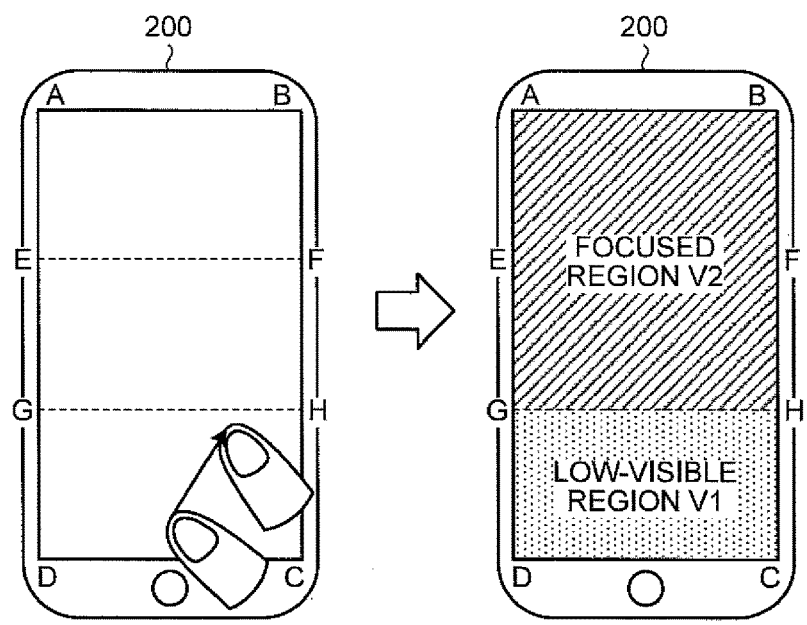
FIG. 9 is a diagram illustrating exemplary regions defined on a display unit.

FIG. 9 is a diagram illustrating exemplary regions defined in the display unit 220. As illustrated in FIG. 9, the specifying unit 235 may specify the low-visible region V1 and the focused region V2 based on Region ABFE, Region EFHG, and Region CDGH vertically dividing Region ABCD corresponding to the display unit 220 in three. For example, as illustrated in FIG. 9, if a move operation has been performed in Region CDGH, the specifying unit 235 specifies Region CDGH as the low-visible region V1 so as to specify Region ABHG that is a region except for Region CDGH as the focused region V2. If a move operation has been performed in Region ABFE, the specifying unit 235 specifies Region CDEF as the focused region V2.

If a move operation has been performed in Region EFHG, the specifying unit 235 may specify Region EFHG as the low-visible region V1 so as to specify both of Region ABFE and Region CDGH as the focused region V2.

For example, as illustrated in FIG. 2A, when the web page W1 has a vertical size longer than the vertical size of the display unit 220, the user is likely to perform a move operation to move the web page W1 upward when contents are initially displayed in response to a request. When performing the upward move operation near a central part of the display unit 220, in other words, in Region EFHG, the user is likely to view both of Region ABFE and Region CDGH rather than viewing one of Region ABFE and Region CDGH. For example, when the user is trying to view contents in Region ABHG, the contents in Region ABHG are immediately moved out of the display unit 220 because the web page W1 is scrolled upward. Thus, the user tries to understand the contents by moving eyes from Region CDGH to Region ABFE in response to the upward scroll so as to view the contents in a longer time.

The specifying unit 235 specifies both of Region ABFE and Region CDGH as the focused region V2 based on such a user tendency if a move operation has been performed in Region EFHG. The specifying unit 235 is not necessarily limited to this example, but may specify one of Region ABFE and Region CDGH as the focused region V2 at random.

7-4. Detection of Tilt and Direction

The above-described embodiments describe the example in which the detecting unit 233 detects a move operation as the usage manner of the information processing device 200 by the user. However, the detecting unit 233 may detect, as the usage manner of the user, the tilt of the information processing device 200 or the orientation of the information processing device 200. The specifying unit 235 specifies the focused region V2 based on the tilt and the orientation detected by the detecting unit 233.

In this case, the detecting unit 233 may be, for example, an acceleration sensor or a geomagnetic sensor included in the information processing device 200. For example, the acceleration sensor transmits information on the elevation (tilt in the vertical direction) of the information processing device 200 to the specifying unit 235. The geomagnetic sensor transmits information on the azimuth angle (rotational angle in the horizontal direction) of the information processing device 200 to the specifying unit 235.

Typically, the user is likely to hold, with one hand (the right hand, for example), the information processing device 200 at 45° toward the user with an upper part thereof pointing forward from the user. Holding the information processing device 200 in this manner, the user is likely to place a thumb near the operation region AR1 illustrated in FIG. 2A although not touching the display unit 220 or performing a move operation. In such a case, the user is likely to be viewing Region ABFE.

Assume that the specifying unit 235 has received information of "elevation: 30° to 60° and azimuth angle: 0°" from the acceleration sensor and the geomagnetic sensor based on such a user tendency. In this case, the specifying unit 235 determines that the user is currently holding the information processing device 200 with one hand and viewing Region ABFE on the display unit 220, and specifies Region ABFE as the focused region V2. After the focused region V2 is specified in this manner, the determination unit 236 determines that advertisement contents have been displayed if the advertisement contents have been included in the focused region V2 or have become included in the focused region V2 by a move operation.

7-5. Display Program

Various contents (for example, the web page W1) including the above-described advertisement contents may be displayed on the display unit 220 through a display program such as a browser. The processing of specifying a focused region on which the user is focused for the display unit 220 corresponds to specification of a focused region on which the user is focused for contents displayed by the display program.

The specifying unit 235 may acquire a display region that is a region displayed on the display unit 220 from among regions displayed by the display program, and specify the low-visible region in the acquired display region so as to specify the visible region.

For example, the specifying unit 235 divides the acquired display region into a plurality of regions and specifies, from among the regions, a region including a detected position on which a move operation is detected as the low-visible region, so as to specify a visible region except for the low-visible region as a focused region. In other words, the specifying unit 235 can apply the processing exemplarily described with the display unit 220 to the acquired display region.

7-6. Application

In the above-described embodiments, each component (the detecting unit 233, the specifying unit 235, the determination unit 236, and the transmitting unit 237, in particular) and processing at the component are achieved by control information transmitted along with advertisement contents by the advertisement server device 100. However, for example, the detecting unit 233, the specifying unit 235, the determination unit 236, and the transmitting unit 237 may be achieved by a predetermined application. The predetermined application may be, for example, an application for displaying predetermined contents (for example, the web page W1).

7-7. Hardware Configuration

Figure 10:
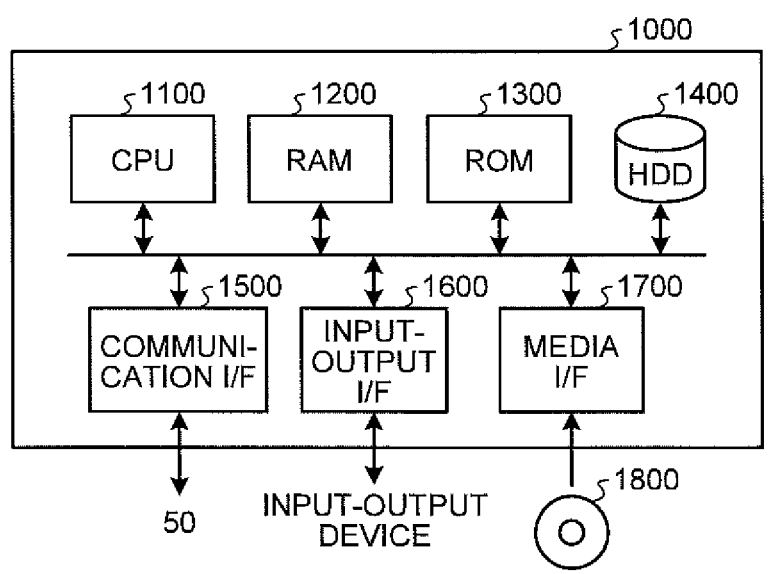
FIG. 10 is a hardware configuration diagram illustrating an exemplary computer that achieves the functionality of the information processing device.

The information processing device 200 according to the above-described embodiments is implemented with a computer 1000 having, for example, the configuration illustrated in FIG. 10. FIG. 10 is a hardware configuration diagram illustrating an example of the computer 1000 that achieves the functionality of the information processing device 200. The computer 1000 includes a CPU 1100, a RAM 1200, a ROM 1300, a HDD 1400, a communication interface (I/F) 1500, an input-output interface (I/F) 1600, and a media interface (I/F) 1700.

The CPU 1100 operates based on a computer program stored in the ROM 1300 or the HDD 1400, and controls each component. The ROM 1300 stores therein, for example, a boot program executed by the CPU 1100 when the computer 1000 starts up, and a computer program dependent on the hardware of the computer 1000.

The HDD 1400 stores therein, for example, a computer program executed by the CPU 1100 and data used by the computer program. The communication interface 1500 receives data from another instrument through a communication network 50 and feeds the data to the CPU 1100, and then transmits data generated by the CPU 1100 to the other instrument through the communication network 50.

The CPU 1100 controls output devices such as a display and a printer and input devices such as a keyboard and a mouse through the input-output interface 1600. The CPU 1100 acquires data from the input devices through the input-output interface 1600. The CPU 1100 outputs generated data to the output devices through the input-output interface 1600.

The media interface 1700 reads a computer program or data stored in a recording medium 1800, and provides the computer program or the data to the CPU 1100 through the RAM 1200. The CPU 1100 loads this computer program onto the RAM 1200 from the recording medium 1800 through the media interface 1700, and executes the loaded computer program. The recording medium 1800 is, for example, an optical recording medium such as a Digital Versatile Disc (DVD) or a Phase change rewritable Disk (PD), a magneto optical recording medium such as a Magneto-Optical disk (MO), a tape medium, a magnetic recording medium, or a semiconductor memory.

For example, when the computer 1000 serves as the information processing device 200 according to the embodiment, the CPU 1100 of the computer 1000 achieves the functionality of the control unit 230 by executing a computer program loaded on the RAM 1200. The CPU 1100 of the computer 1000 reads and executes such a computer program from the recording medium 1800, but in another example, the program may be acquired from another device through the communication network 50.

8. Other Embodiments

Among the pieces of processing described in the above-described embodiments, all or some pieces of processing described as automatically performed processing may be manually performed, or all or some pieces of processing described as manually performed processing may be automatically performed by the well-known method. In addition, information including processing procedures, specific names, and various kinds of data and parameters described in the above specification and drawings may be optionally changed unless otherwise stated. For example, various pieces of information described with reference to the drawings are not limited to information illustrated in the drawings.

Components of devices illustrated in the drawings represent conceptual functions and are not necessarily physically configured as illustrated in the drawings. In other words, specific configurations of distribution and integration of the devices are not limited to the illustrated configurations. All or some of the devices may be functionally or physically distributed and integrated in optional units depending on various loads and use conditions.

The above-described embodiments may be combined as appropriate while consistency of processing contents is maintained.

9. Advantageous Effects

The information processing device 200 according to the embodiment includes the detecting unit 233, the specifying unit 235, and the determination unit 236. The detecting unit 233 detects a move operation to move contents displayed on the display screen of the information processing device 200. The specifying unit 235 specifies a focused region on which the user is focused for the display screen of the information processing device 200 based on a result of the detection by the detecting unit 233.

With this configuration, the information processing device 200 can accurately specify a region of the display screen on which the user is focused.

The detecting unit 233 in the information processing device 200 according to the embodiment specifies a focused region on which the user is focused for contents displayed by a predetermined display program.

With this configuration, the information processing device 200 can accurately specify the focused region on contents displayed by the predetermined display program.

The specifying unit 235 also specifies a focused region based on a detected position on which a move operation has been detected by the detecting unit 233.

With this configuration, the information processing device 200 can specify a low-visible region based on such a user tendency that a user is unlikely to view contents in a region in which a move operation is performed, thereby accurately specifying the focused region.

The specifying unit 235 also specifies a focused region based on an operation frequency at which a move operation is performed.

With this configuration, the information processing device 200 can specify, as a low-visible region, a region in which the user is likely to perform a move operation on the display screen, thereby more accurately specifying a focused region.

The specifying unit 235 also specifies, if a move operation is performed in a predetermined region of the display screen at an operation frequency equal to or larger than a predetermined value, a region except for the predetermined region as a focused region.

With this configuration, the information processing device 200 can specify, as a low-visible region, a region in which the user is likely to perform a move operation on the display screen, thereby more accurately specifying a focused region.

The specifying unit 235 also specifies the entire display screen as a focused region if move operate have been detected across a plurality of regions of the display screen.

If move operations have dispersively performed in a plurality of regions, the user is likely to be viewing various parts of the display screen. In this case, instead of specifying a particular region as a focused region, the information processing device 200 can specify the entire display screen as the focused region in a flexible manner in accordance with characteristics of the user.

The determination unit 236 in the information processing device 200 according to the embodiment determines whether contents have been displayed in a focused region.

With this configuration, the information processing device 200 can determine that contents highly possibly been viewed by the user have been displayed, thereby obtaining the number of display times at a higher accuracy.

The specifying unit 235 also specifies a low-visible region in which the user's visibility is reduced by a move operation in a predetermined region of the display screen so as to specify a region except for the low-visible region as a focused region.

With this configuration, the information processing device 200 can specify the low-visible region based on such a user tendency that the user is unlikely to view contents in a region in which a move operation is performed, thereby accurately specifying the focused region.

The determination unit 236 also determines whether advertisement contents have been displayed in the focused region.

With this configuration, the information processing device 200 can determine that advertisement contents highly possibly been viewed by the user have been displayed, thereby obtaining the number of display times at a higher accuracy.

The information processing device 200 further includes the transmitting unit 237 configured to transmit a result of the determination by the determination unit 236 to the advertisement server device 100 that counts the number of display times that contents have been displayed in the focused region.

With this configuration, the information processing device 200 can count the number of display times of contents highly possibly been actually viewed by the user, thereby achieving a higher counting accuracy.

The transmitting unit 237 transmits a predetermined value as the number of display times to the advertisement server device 100 if the determination unit 236 determines that contents have been displayed in the focused region. The transmitting unit 237 transmits, as the number of display times, a value smaller than the predetermined value to the advertisement server device 100 if the determination unit 236 determines that the contents have been displayed in the low-visible region.

For example, the user is sufficiently likely to view not only contents in the focused region V2 but also contents in the low-visible region V1. However, the user has a characteristic that the user tends to view the more easily viewable contents in the focused region V2, and thus the information processing device 200 sets the number of display times that contents have been displayed in the low-visible region V1 to be lower (for example, "0.5 time") than the number of display times (for example, "once") that contents have been displayed in the focused region V2. Accordingly, the information processing device 200 can set the number of display times in a flexible manner with taken into account a user tendency when viewing contents, thereby achieving a higher accuracy of counting of the number of display times by the advertisement server device 100.

The transmitting unit 237 transmits a predetermined value to a predetermined server device if the determination unit 236 determines that contents have been displayed in the low-visible region and then moved in response to a move operation to be displayed in the focused region.

For example, the information processing device 200 can set the number of display times to "once" for contents the number of display times of which has been set to "0.5 time" when the contents were displayed in the low-visible region V1, when the contents are displayed in the focused region V2 after a move operation. In this manner, the information processing device 200 can set the number of display times in a flexible manner in response to the move of contents due to a move operation, thereby achieving a higher accuracy of counting of the number of display times by the advertisement server device 100.

The detecting unit 233 detects, as the usage manner of the user, the tilt of the information processing device 200 or the orientation of the information processing device.

Most users tend to hold the information processing device 200 in a particular manner when viewing the display screen of the information processing device 200. For example, most users tend to hold, with one hand, the information processing device 200 in a tilted manner toward the users with the upper part thereof pointing forward from the users, while placing a thumb on part of the display screen. As described above, the information processing device 200 can specify the low-visible region with taken into account characteristics of the user when holding the device, thereby accurately specifying a focused region.

The above describes the embodiments of the present application in detail with reference to the drawings, but these embodiments are merely exemplary. The present invention may be achieved in other configurations provided with various kinds of changes and modifications based on the aspects described in the disclosure of the invention together with the knowledge of the skilled person in the art.

Any "unit" in the above description is interchangeable with "means" and "circuit". For example, "detecting unit" is interchangeable with "detecting means" and "detecting circuit".

An aspect of an embodiment can provide an advantageous effect of determining that contents highly possibly been viewed by a user have been displayed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a display screen configured to display contents, a display area of the display screen being divided into at least two regions; and
a processor operatively coupled to the display screen, the processor being programmed to:
detect a scroll operation to move the contents displayed on the display screen;
in response to detecting the scroll operation, determine a plurality of locations on the display area of the display screen between which the scroll operation is performed;
specify one region of the at least two regions that includes the determined locations on the display area as a low-visible region in which a visibility by a user is reduced by the scroll operation; and
specify at least one remaining region of the at least two regions as a focused region on which the user is focused on the display screen, the focused region being specified based on an operation frequency at which the scroll operation is performed.

2. The information processing device according to claim 1, wherein the processor is programmed to specify the focused region on which the user is focused for the contents displayed by a predetermined display program.

3. The information processing device according to claim 1, wherein the processor is programmed to specify, when the scroll operation is performed in a predetermined region of the display area of the display screen at the operation frequency equal to or larger than a predetermined value, a region except for this predetermined region as the focused region.

4. The information processing device according to claim 1, wherein the processor is programmed to specify the entire display screen as the focused region when the scroll operation is detected in a plurality of regions of the display screen.

5. The information processing device according to claim 1, wherein the processor is programmed to determine whether the contents have been displayed in the focused region.

6. The information processing device according to claim 5, wherein the processor is programmed to determine whether advertisement contents have been displayed as the contents in the focused region.

7. The information processing device according to claim 1, wherein the processor is programmed to transmit a result of the determination to a predetermined server device configured to count a number of display times that the contents have been displayed in the focused region.

8. The information processing device according to claim 7, wherein the processor is programmed to:
transmit a predetermined value as the number of display times to the predetermined server device when the contents are determined to be displayed in the focused region, and
transmit, as the number of display times, a value smaller than the predetermined value to the predetermined server device when determining that the contents have been displayed in the low-visible region.

9. The information processing device according to claim 7, wherein the processor is programmed to transmit the predetermined value to the predetermined server device when the contents are determined to be displayed in the low-visible region and then scrolled in response to the scroll operation to be displayed in the focused region.

10. The information processing device according to claim 1, wherein the processor is programmed to detect, as a usage manner of the user, a tilt of the information processing device or an orientation of the information processing device.

11. An information processing method executed by a computer, the method comprising:
detecting a scroll operation to move contents displayed on a display screen of an information processing device, the display screen being configured to display contents, a display area of the display screen being divided into at least two regions;

in response to detecting the scroll operation, determining a plurality of locations on the display area of the display screen between which the scroll operation is performed;

specifying one region of the at least two regions that includes the determined locations on the display area as a low-visible region in which a visibility by a user is reduced by the scroll operation; and specifying at least one remaining region of the at least two regions as a focused region on which the user is focused on the display screen, the focused region being specified based on an operation frequency at which the scroll operation is performed.

12. A non-transitory computer readable storage medium having stored therein an information processing program configured to causing a computer to execute a process comprising:

detecting a scroll operation to move contents displayed on a display screen of an information processing device, the display screen being configured to display contents, a display area of the display screen being divided into at least two regions;

in response to detecting the scroll operation, determining a plurality of locations on the display area of the display screen between which the scroll operation is performed;

specifying one region of the at least two regions that includes the determined locations on the display area as a low-visible region in which a visibility by a user is reduced by the scroll operation; and specifying at least one remaining region of the at least two regions as a focused region on which the user is focused on the display screen, the focused region being specified based on an operation frequency at which the scroll operation is performed.

13. A distribution device comprising:

a processor programmed to distribute control information to an information processing device, the control information being configured to cause the information processing device to execute a process including:

detecting a scroll operation to move contents displayed on a display screen of the information processing device, the display screen being configured to display contents, a display area of the display screen being divided into at least two regions;

in response to detecting the scroll operation, determining a plurality of locations on the display area of the display screen between which the scroll operation is performed;

specifying one region of the at least two regions that includes the determined locations on the display area as a low-visible region in which a visibility by a user is reduced by the scroll operation; and specifying at least one remaining region of the at least two regions as a focused region on which the user is focused on the display screen, the focused region being specified based on an operation frequency at which the scroll operation is performed.

* * * * *